Jan. 20, 1953  D. A. YOUNG ET AL  2,626,201
RECORDING INSTRUMENT PEN MECHANISM
Filed May 28, 1947
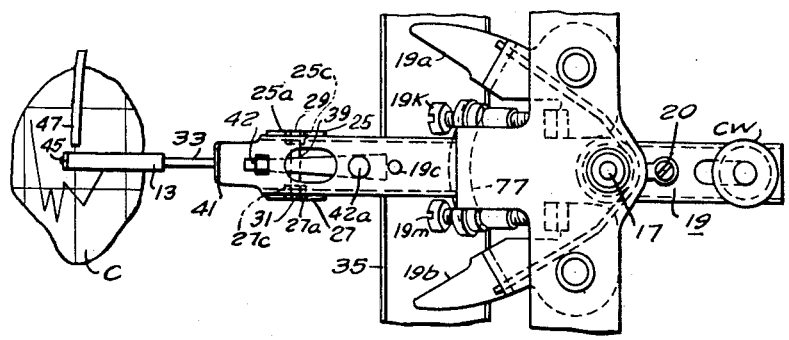
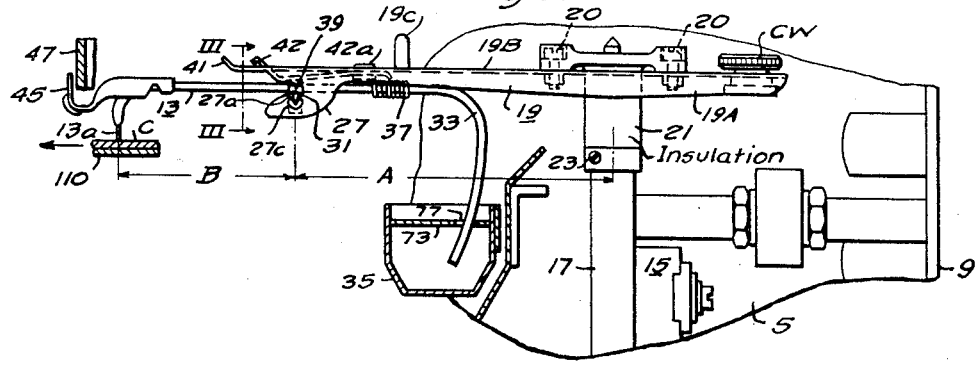
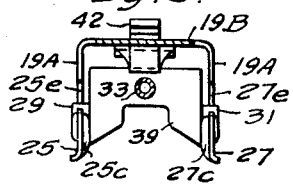
WITNESSES:
INVENTORS
Douglass A. Young, Lawrence J. Lunos
and Joseph C. Nycz.
BY
ATTORNEY Patented Jan. 20, 1953

2,626,201

UNITED STATES PATENT OFFICE 2,626,201

RECORDING INSTRUMENT PEN MECHANISM

Douglass A. Young, East Orange, Lawrence J. Lunas, Cedar Grove, and Joseph C. Nycz, Towaco, N. J., assignors to Westinghouse Electric Corporation, East Pittsburgh, Pa., a corporation of Pennsylvania Application May 28, 1947, Serial No. 750,936

14 Claims. (Cl. 346—140)

1

This invention relates to recording devices and it has particular relation to recording pen assemblies suitable for producing a record on a horizontal chart surface.

Several desiderata may be listed for recording pen assemblies. For example, the pen assembly should be accessible for cleaning and other servicing operations. It should have low inertia to permit the pen assembly to follow rapid changes in a variable quantity to be recorded. Furthermore, it is desirable that the pen assembly operate with a low pen pressure on an associated chart or record strip. It is also highly desirable that the pen assembly provide a continuous record despite rapid fluctuations in the variable quantity to be recorded.

In the construction which also is described in the copending patent application of Young et al., Serial No. 750,935, filed concurrently herewith and assigned to the same assignee, a pen element is mounted for rotation about a vertical axis in accordance with a variable quantity to be recorded. Conveniently, the pen element may include a capillary tube having a pen point at one end thereof. The capillary tube is mounted for rotation about a horizontal axis which is located between the ends of the tube. Consequently, portions of the tube on opposite sides of the horizontal axis tend to balance each other and a minimum of counter weight is required. The horizontal axis is spaced by an appreciable distance from the vertical axis. This permits the utilization of a relatively short capillary tube with a consequent reduction in the inertia of the pen element about the horizontal axis and facilitates servicing of the pen element.

The invention contemplates a location on the horizontal axis below the line of action of the resultant centrifugal force acting on the pen element as a result of rotation of the pen element about the vertical axis. Because of this location of the horizontal axis, the resultant centrifugal force develops a torque acting to urge the pen point toward the associated horizontal chart surface. Since the centrifugal force tends to maintain contact between the pen point and the chart surface and since the pen element has extremely low inertia, extremely light pen pressures may be employed when the pen element is stationary or moving slowly. A continuous record is obtained under all conditions of operation.

In a preferred embodiment of the invention, an inkwell or a reservoir for marking material is located between the vertical axis and a vertical line passing through the horizontal axis.

It is, therefore, an object of the invention to

2 provide an improved recording device employing a pen element.

It is a further object of the invention to provide a pen assembly for recording a variable quantity wherein fluctuations of the variable quantity produce centrifugal forces acting to urge the point of the pen assembly against an associated chart surface.

It is still another object of the invention to provide a pen element for a recording device which has low inertia and which in operation develops centrifugal forces urging the point of the pen element toward an associated chart surface.

Other objects of the invention will be apparent from the following description, taken in conjunction with the accompanying drawing, in which:

Figure 1 is a view in elevation with parts broken away of a recording device embodying the invention;

Fig. 2 is a view in top plan showing a portion of the recording device illustrated in part in Fig. 1;

Fig. 3 is a sectional enlarged view taken along the line III—III of Fig. 1; and

Fig. 4 is an enlarged view in side elevation of a portion of the device illustrated in Fig. 1.

Referring to the drawing, Figure 1 shows a recording device which may include a suitable supporting structure. For example, the supporting structure may include a base 9 having enclosing walls 5 projecting therefrom. In addition, the supporting structure may include a horizontal table 110 for supporting a chart or record strip C in position to receive a record. This chart or record strip may be designed for movement across the face of the table 110 in the direction of the arrow. The structure of Fig. 1 is illustrated in a complete recording device in the aforesaid copending application of Young et al.

A recording pen or pen element 13 has a pen point 13a positioned to produce a record on the chart or record strip C. The supporting structure may include a housing or casing for a mechanism designed to actuate the recording pen 13 in accordance with a quantity to be recorded. The top portion of such mechanism is indicated in Fig. 1 by a reference character 15. Such mechanism rotates a vertical shaft 17 in accordance with the quantity to be recorded. The mechanism may be of a mechanical, thermal or electrical nature depending on the quantity to be recorded. As representative of suitable mechanisms, ammeters, voltmeters or wattmeters may be employed. For the purpose of discussion, it will be assumed that the mechanism 15 represents an electrical instrument.

As shown in Fig. 1, the electrical instrument 15 has a vertical shaft 17 which is rotated in accordance with the magnitude of a quantity to be recorded. A pen bracket 19 is secured to the shaft 17 in any suitable manner for rotation therewith. This bracket may have substantially a channel cross-section to provide a rigid structure of low weight. The channel may be constructed from lightweight material such as Duralumin or sheet aluminum, and may have side flanges 19A bent at right angles to a top wall 19B. As illustrated in Fig. 1, the pen bracket has secured thereto by bolts 20 a bushing 21 which is proportioned to receive therein the shaft 17. A setscrew 23, which is in threaded engagement with the bushing 21, engages the shaft 17 to secure the bushing thereto. In some cases it may be desirable to construct the bushing 21 from insulating material.

At its front end, the pen bracket has its flanges enlarged to provide a pair of spaced parallel bearing supports 25 and 27. Each of the bearing supports is provided with a notch 25a or 27a, for receiving knife-edge pivots 29 and 31 which are secured to the recording pen 13. The notches are substantially larger than the pivots to provide ample clearances for parts of the pivots other than the knife edges. The shape of the notches will be understood by an examination of the notch 27a in Fig. 4. It will be noted that the notch has a surface 27b engaging the pivot 31. The surface 27b may be provided by a phosphor bronze insert 27c which is riveted or otherwise secured to the bearing support 27 if a material other than that of the supports is desired for bearing purposes. A similar insert 25c may be provided for the bearing support 25.

By inspection of the drawing, it will be observed that the pivots 29 and 31 cooperate with the bearing supports 25 and 27 to mount the recording pen 13 for pivotal movement about a horizontal axis with respect to the pen bracket 19. It will be observed further that this horizontal axis is spaced from the vertical axis of the shaft 17 by a distance A which is a major part of the distance A+B between the pen point 13a of the recording pen and the vertical axis of the shaft 17. In a unit actually constructed, the distance A was approximately two-thirds of the total distance A+B. This construction facilitates the design of an extremely light recording pen 13.

The recording pen comprises a small capillary tube 33 which extends from the pen point 13a toward the shaft 17. The tube 33 has its end nearest the shaft 17 bent downwardly for reception in an inkwell 35. Consequently, ink from the inkwell 35 is supplied through the tube 33 to the pen point 13a for application to a chart strip C positioned beneath the pen point. Conveniently, the inkwell may be located approximately midway between the shaft 17 and a vertical line intersecting the horizontal axis defined by the pivots 29 and 31.

It will be noted further that the pivots 29 and 31 are disposed between the ends of the tube 33. Consequently, portions of the tube 33 on opposite sides of the pivots tend to balance each other. Additional balancing is obtained by means of the weight of a coil spring 37 having turns which frictionally grip the tube 33. The parameters may be selected to permit location of the spring 37 on either side of the horizontal axis. As shown in Fig. 1, the spring is on the right of the axis. By inspection of Fig. 1, it will be observed that the position of the spring 37 is readily adjustable along the tube 33 for the purpose of adjusting the balance of the recording pen.

The positions of the pivots 29 and 31 are so selected that centrifugal force resulting from rotation of the shaft 17 urges the pen point 13a into firmer contact with the chart strip C. A bracket 39 secures the pivots to the tube 33. It will be noted that the axis of rotation of the tube 33 established by the pivots 29 and 31 is substantially below the tube. The displacement of the axis relative to the tube is so related to the parameters of the pen assembly that moments about the axis produced by centrifugal forces resulting from rotation of the shaft 17 maintain the pen point in contact with the chart strip C. With the construction illustrated in the drawing, it has been found feasible to reduce the static pressure of the recording pen against the chart strip C appreciably below values conventionally employed. For example, a pressure of only 20 milligrams has been found adequate in a recording device built and tested.

Since the recording pen is of extremely light construction, and since the pivots 29 and 31 are relatively close to the pen point 13a, irregularities of the surface of the chart strip C do not tend to force the pen point appreciably away from the chart strip. As a matter of fact, in actual operation, it has been found that violent movement of the recording pen about the axis of the shaft 17 does not prevent the production of a legible record on the chart strip. Preferably, the bracket 19 and associated pen assembly are balanced relative to the shaft 17, as by a counterweight CW adjustably secured to the bracket 19.

The pen bracket 19 is provided with a guide tongue 41 for guiding the recording pen relative to the bracket 19 into its operative position. Openings 25e and 27e in the supports 25 and 27 permit introduction of the pivots into the notches 25a and 27a. In order to remove the recording pen, it is merely necessary to raise the pen sufficiently for the pivots 31 and 29 to clear the notches 25a and 27a. The recording pen then is withdrawn toward the front of the recording device.

A leaf spring 42 may have one end secured to the top wall 19B in any suitable manner as by means of a rivet 42a. This spring has a resilient portion positioned slightly above the bracket 39 to prevent accidental displacement of the knife edges from the associated notches. The bracket may be moved upwardly to deflect the spring when it is desired to remove the pen from its operative position.

If an indication of the movement of the recording pen is desired, a target 45 may be secured to the end of the recording pen. This target preferably is constructed of a lightweight material such as sheet aluminum suitably bent or formed and is positioned to rotate across the front of a scale 47 as the shaft 17 of Fig. 1 rotates.

If desired, stops 19a and 19b (Fig. 2) may be provided for limiting rotation of the pen assembly about the vertical axis of the associated measuring instrument. These stops serve as abutments for a pin 19c which is secured to the bracket 19. The stops may be adjustable by means of adjusting screws 19k and 19m. Since the stops form no part of the present invention and since they are disclosed in detail in the aforesaid copending patent application of Young et al., further discussion thereof is believed to be unnecessary.

Referring to Fig. 1, it will be noted that the left-hand end of the capillary tube 33 is bent downwardly to position the pen point 13a adjacent the chart or record strip C. The right-hand end of the tube 33 also is bent downwardly for immersion in ink or marking material contained within the inkwell 30. The inkwell may have a cover 73 provided with an arcuate opening 77 to permit movement of the tube 33 relative to the inkwell.

It is believed that the operation of the recording device is apparent from the foregoing description. The pen bracket 19 is of extremely rigid construction and moves with the shaft 17 as a unit to position the pen element angularly about the axis of the shaft 17. The only forces acting about the horizontal axis defined by the pivots 29 and 31 are those resulting from movements of the tube 33 and parts secured to the tube. Since the tube is relatively short and since the pen element is of light construction, the pen element has low inertia.

It will be recalled that the resultant centrifugal force acting on the pen element as a result of rotation thereof about the vertical axis 17 has a line of action which is located above the horizontal axis defined by the pivots 29 and 31. Consequently, this force develops a torque about the horizontal axis which urges the pen point 13a toward the chart strip C. The torque coupled with the low inertia of the pen element assures the production of a continuous record on the chart strip with light pen pressures despite rapid angular movements of the shaft 17.

By selection of a large distance A, the pen element is made relatively small and is positioned adjacent the front of the recording device where it is readily accessible for removal, installation and servicing. The maximum distance A which can be selected is dependent on a number of design factors. For example, other portions of the recording device may dictate the location of the inkwell 35 and the position of the rear end of the capillary tube 33. Furthermore, the distance B should not be so small that objectionable tilting of the pen point from its best operating position results. As representative of suitable dimensions, a recording device has been built wherein the distance A is $3\tfrac{1}{16}$ inches and the distance B is $1\tfrac{23}{32}$ inches.

The distance D (Fig. 4) from the capillary tube to the horizontal axis defined by the pivots 29 and 31 determines in part the torque acting about the horizontal axis produced by centrifugal forces acting on the pen element. As previously pointed out, the line of action of the resultant centrifugal force preferably is located above the horizontal axis. For example, in a recording device actually constructed, the distance D had a value of 0.17 inch. Since sudden variations of the variable quantity to be recorded result in a resultant centrifugal force which tends to urge the pen point 13a toward its associated chart strip, satisfactory records can be obtained with a static pen point pressure on the chart strip of only 20 milligrams. It will be understood that by suitable selection of the value of the distance D, the torque resulting from the aforesaid centrifugal forces may be given any desired value.

Although the invention has been described with reference to certain specific embodiments thereof, numerous modifications thereof are possible. Therefore, the appended claims should be interpreted to cover not only the specific embodiments illustrated but also all other embodiments falling within the spirit and scope of the invention.

We claim as our invention:

1. In a device for producing a record on a surface, a marking unit, a supporting structure for supporting a record element to receive a mark from the marking unit, an ink reservoir supported by the supporting structure for supplying ink to the marking unit, means mounting the marking unit for pivotal movement relative to the supporting structure and relative to the inkwell across the surface of a record element supported by the structure, said marking unit having a weight distribution developing a centrifugal force which urges the marking unit towards a record element supported by the structure in response to said pivotal movement of the marking unit, said centrifugal force bearing a predetermined relation to said pivotal movement.

2. In a device for producing a record on a surface, a marking element movable in a predetermined plane to produce a record on a record element, a supporting structure for supporting a record element in position to receive a mark from the marking element, means mounting the marking element in substantial gravitational balance for pivotal movement relative to the supporting structure about a first axis parallel to the plane, and means mounting the marking element for pivotal movement relative to the supporting structure about a second axis perpendicular to the plane, said axes being spaced from each other, said first axis being spaced from the line of action of the resultant centrifugal force produced by rotation of the marking element about the second axis to develop a torque acting about the first axis to urge the marking element towards a record element supported by said structure.

3. In a device for producing a record on a surface, a marking element movable in a predetermined plane to produce a record on a record element, a supporting structure for supporting a record element in position to receive a mark from the marking element, means mounting the marking element in substantial gravitational balance for pivotal movement relative to the supporting structure about a first axis parallel to the plane, and means mounting the marking element for pivotal movement relative to the supporting structure about a second axis perpendicular to the plane, said axes being spaced from each other, said first axis being spaced from the line of action of the resultant centrifugal force produced by rotation of the marking element about the second axis to develop a torque acting about the first axis to urge the marking element towards a record element supported by said structure, said plane being horizontal and said structure having a substantially horizontal surface for supporting a record element beneath the marking element, said marking element comprising a marking point for depositing marking material on a record element disposed on the horizontal surface, and a feed element for feeding marking material to the marking point, said feed element having a portion extending substantially parallel to the horizontal surface and perpendicular to the first axis, the first axis being located substantially below said portion of the feed element.

4. In a device for producing a record on a surface, a marking element movable in a predetermined plane to produce a record on a record element, a supporting structure for supporting a record element in position to receive a mark from the marking element, means mounting the marking element in substantial gravitational balance for pivotal movement relative to the supporting structure about a first axis parallel to the plane, and means mounting the marking element for pivotal movement relative to the supporting structure about a second axis perpendicular to the plane, said axes being spaced from each other, said first axis being spaced from the line of action of the resultant centrifugal force produced by rotation of the marking element about the second axis to develop a torque acting about the first axis to urge the marking element towards a record element supported by said structure, said plane being horizontal and said structure having a substantially horizontal surface for supporting a record element beneath the marking element, said marking element comprising a marking point for depositing marking material on a record element disposed on the horizontal surface, and a feed element for feeding marking material to the marking point, said feed element having a portion extending substantially parallel to the horizontal surface and perpendicular to the first axis, the first axis being located substantially below said portion of the feed element, said first axis being located intermediate the marking point and the second axis, the distance between the axes being over half the distance between the marking point and the second axis.

5. In a device for producing a record on a surface, a marking element movable in a predetermined plane to produce a record on a record element, a supporting structure for supporting a record element in position to receive a mark from the marking element, means mounting the marking element in substantial gravitational balance for pivotal movement relative to the supporting structure about a first axis parallel to the plane, and means mounting the marking element for pivotal movement relative to the supporting structure about a second axis perpendicular to the plane, said axes being spaced from each other, said first axis being spaced from the line of action of the resultant centrifugal force produced by rotation of the marking element about the second axis to develop a torque acting about the first axis to urge the marking element towards a record element supported by said structure, said plane being horizontal and said structure having a substantially horizontal surface positioned to support a record element beneath the marking element.

6. In a device for producing a record on a surface, a marking element movable in a predetermined plane to produce a record on a record element, a supporting structure for supporting a record element in position to receive a mark from the marking element, means mounting the marking element in substantial gravitational balance for pivotal movement relative to the supporting structure about a first axis parallel to the plane, and means mounting the marking element for pivotal movement relative to the supporting structure about a second axis perpendicular to the plane, said axes being spaced from each other, said first axis being spaced from the line of action of the resultant centrifugal force produced by rotation of the marking element about the second axis to develop a torque acting about the first axis to urge the marking element towards a record element supported by said structure, the marking element comprising a marking point and a feed tube having a first end connected to the marking point for feeding marking material to the point, said feed tube having a second end extending away from the first axis towards the second axis but terminating short of the second axis, and a reservoir for marking material positioned by the supporting structure to receive the second end of the tube, said tube being movable about said axes relative to the reservoir.

7. In a recording device, a support, a pen bracket, means mounting the pen bracket for movement relative to the support about a substantially vertical axis in accordance with a variable quantity to be recorded, a recording pen element having a pen point and having an ink feed tube extending away from the pen point towards the vertical axis, the pen point being disposed to mark a horizontally disposed surface, means mounting the recording pen element on the pen bracket for rotation about a substantially horizontal axis intermediate the ends of the feed tube, the distance between the horizontal axis and the vertical axis being a major part of the distance between the pen point and the vertical axis, said horizontal axis being substantially perpendicular to a plane containing the vertical axis, and the horizontal axis being positioned below the line of action of the centrifugal force produced by movement of the pen element about the vertical axis for urging the pen point towards a surface on which a record is to be made by said centrifugal force.

8. In a recording device, a recording pen element comprising a pen point, and a tube having one end connected to the pen point and having a second end through which ink is admissible for transmission through the tube to the pen point, and bearing means associated with the recording pen element, the bearing means being positioned intermediate the ends of the tube, whereby portions of the tube on opposite sides of the bearing means tend to balance each other, the bearing means defining an axis of rotation for the tube which is substantially at right angles to the tube, said axis being spaced from the tube.

9. In a recording device, a recording pen element comprising a pen point, a tube having a central portion, the tube having a first end connected to the pen point and having a second end extending angularly from the central portion for receiving ink for transmission through the tube to the pen point, bearing means for said tube defining an axis of rotation for the tube which is substantially at right angles to the central portion of the tube, said bearing means being positioned intermediate the extremities of the central portion of the tube, whereby parts of the tube on opposite sides of the bearing means tend to balance each other, said axis being spaced from the central portion of the tube in the direction of ink feed through the pen point.

10. In a recording device, a recording pen element comprising an ink-conductive tube having a central portion and having ends extending angularly substantially in the same direction from the central portion, a first one of the ends terminating in a pen point, whereby ink supplied to a second one of the ends through the tube to the pen point, and bearing means for said tube defining an axis of rotation for the tube which is substantially at right angles to the central portion and to said ends, said bearing means being positioned between said ends, whereby parts of the tube on opposite sides of the axis tend to balance each other about the axis, said axis being substantially spaced in said direction from the central portion of the tube.

11. In a recording device, a bracket, means mounting the bracket for rotation about a vertical axis in accordance with a variable quantity to be recorded, a recording pen element, bearing means mounting the recording pen element on said bracket for rotation about a horizontal axis spaced from the vertical axis, said recording element comprising a tube extending substantially radially relative to the vertical axis and substantially perpendicular to the horizontal axis, said horizontal axis being intermediate the ends of said tube, whereby the tube is to an appreciable extent self-balanced about the horizontal axis, said recording pen element having a line of action of the centrifugal force exerted thereon by rotation about the vertical axis which is above the horizontal axis.

12. In a recording device, a bracket, means mounting the bracket for rotation about a vertical axis in accordance with a variable quantity to be recorded, a recording pen element, bearing means mounting the recording pen element on said bracket for rotation about a horizontal axis spaced from the vertical axis, said recording element comprising a tube extending substantially radially relative to the vertical axis and substantially perpendicular to the horizontal axis, said horizontal axis being intermediate the ends of said tube, whereby the tube is to an appreciable extent self-balanced about the horizontal axis, said recording pen element having a line of action of the centrifugal force exerted thereon by rotation about the vertical axis which is above the horizontal axis, the recording pen element including a pen point connected to the end of the tube which is more distant from the vertical axis for receiving ink through the tube, said pen point extending downwardly for depositing a record on the upper surface of a horizontally-disposed record element, and said recording pen element including an ink-intake conduit extending downwardly from the end of said tube nearer to the vertical axis.

13. In a recording device, a bracket, means mounting the bracket for rotation about a vertical axis in accordance with a variable quantity to be recorded, a recording pen element, bearing means mounting the recording pen element on said bracket for rotation about a horizontal axis spaced from the vertical axis, said recording element comprising a tube extending substantially radially relative to the vertical axis and substantially perpendicular to the horizontal axis, said horizontal axis being intermediate the ends of said tube, whereby the tube is to an appreciable extent self-balanced about the horizontal axis, said recording pen element having a line of action of the centrifugal force exerted thereon by rotation about the vertical axis which is above the horizontal axis, the recording pen element including a pen point connected to the end of the tube which is more distant from the vertical axis for receiving ink through the tube, said pen point extending downwardly for depositing a record on the upper surface of a horizontally-disposed record element, and said recording pen element including an ink-intake conduit extending downwardly from the end of said tube nearer to the vertical axis, said axes being spaced by a distance greater than half the distance between the pen point and the vertical axis.

14. In a recording device, a bracket, means mounting the bracket for rotation about a vertical axis in accordance with a variable quantity to be recorded, a recording pen element, bearing means mounting the recording pen element on said bracket for rotation about a horizontal axis spaced from the vertical axis, said recording element comprising a tube extending substantially radially relative to the vertical axis and substantially perpendicular to the horizontal axis, said horizontal axis being intermediate the ends of said tube, whereby the tube is to an appreciable extent self-balanced about the horizontal axis, said recording pen element having a line of action of the centrifugal force exerted thereon by rotation about the vertical axis which is above the horizontal axis, the bearing means being configured to permit withdrawal of the recording pen element from operative position in the bracket in response to a predetermined movement of the recording pen element relative to the bracket.

DOUGLASS A. YOUNG.
LAWRENCE J. LUNAS.
JOSEPH C. NYCZ.

REFERENCES CITED

The following references are of record in the file of this patent:

UNITED STATES PATENTS

| Number | Name | Date |
| --- | --- | --- |
| 882,586 | Robinson | Mar. 24, 1908 |
| 899,043 | Harris | Sept. 22, 1908 |
| 1,208,304 | Esterline | Dec. 12, 1916 |
| 1,463,004 | Bowman | July 24, 1923 |
| 2,509,185 | Eckel | May 23, 1950 |